March 14, 1967     E. HORTON     3,308,570
FISHING BAIT CONTAINERS
Filed Sept. 30, 1964
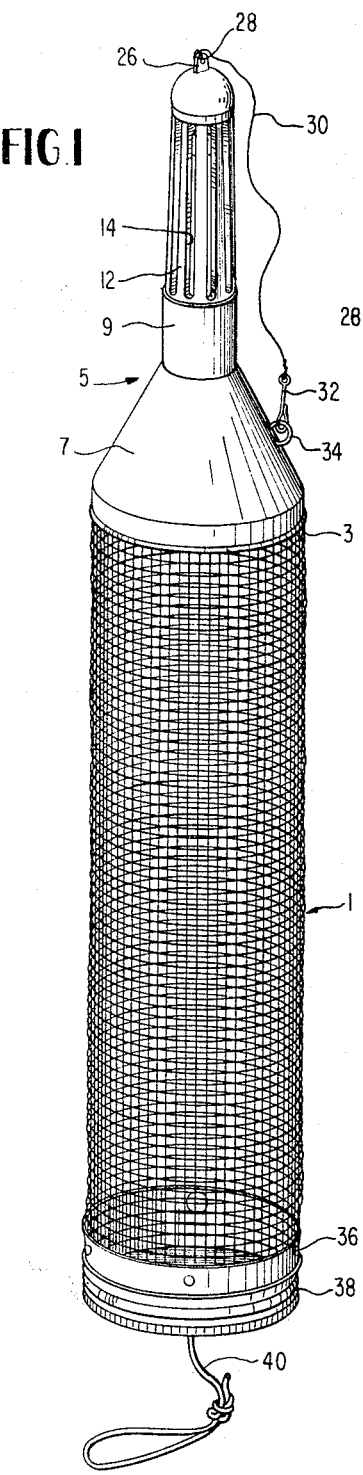
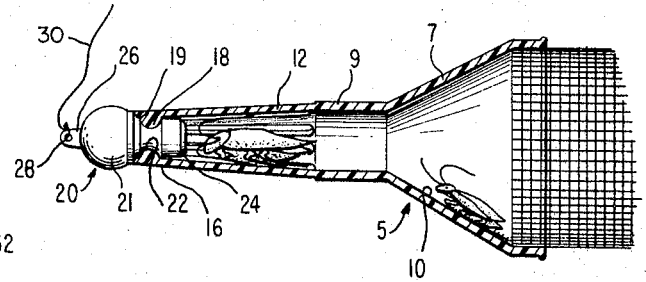
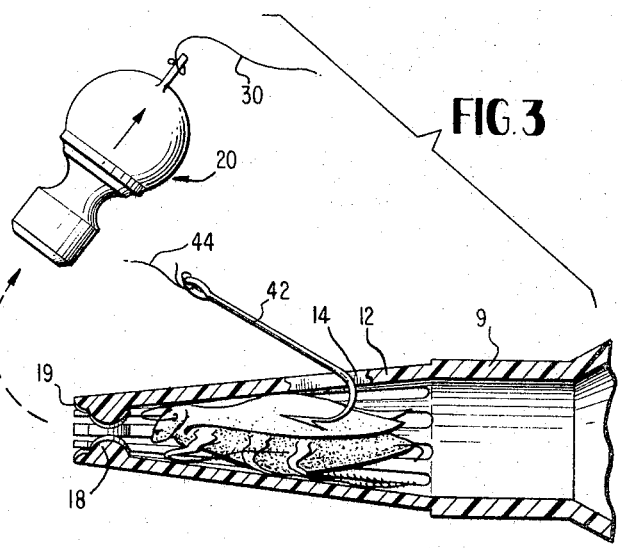
INVENTOR.
EDDIE HORTON
BY
Burns, Doane, Benedict, Swecker & Mathis
ATTORNEYS

United States Patent Office 3,308,570
Patented Mar. 14, 1967

3,308,570
FISHING BAIT CONTAINERS
Eddie Horton, 800 44th Ave. N.,
Nashville, Tenn. 37209
Filed Sept. 30, 1964, Ser. No. 400,333
3 Claims. (Cl. 43—55)

This invention relates to fishing bait containers and, more particularly, to fishing bait containers of the type having a bait dispenser and gripper.

Heretofore, fishing bait containers for grasshoppers, cockroaches, and the like have been available, some of these containers including features which make it unnecessary for the fisherman to physically touch the bait while impaling the same on a fishing hook. Such containers usually include a gripping element adjacent an outlet thereof which may be independently manipulated to grip the bait for impaling the same on a fish hook. However, such containers with bait grippers are not always convenient to operate because care must be taken in positioning the bait adjacent the gripper element and this element independently manipulated at the very time when the fisherman's hands are occupied with holding a fishing rod, a fishing hook, and the bait container itself.

It is an object of this invention to provide a bait container, gripper and dispenser which is uncomplicated and convenient to use.

It is a further object of this invention to provide a bait container and dispenser having a bait gripper which makes it unnecessary for a fisherman to physically touch the bait as the bait is impaled on a fishing hook but requires no care in positioning the bait adjacent to the gripper to permit such impalement.

It is still another object of this invention to provide a bait container and dispenser having a bait gripper which requires no independent manipulation to grip the bait prior to or during impalement of the bait on a hook.

A still further object of this invention is to provide a container for dispensing fishing bait, the container having an outlet with a closure therefor wherein removing the closure results in gripping of the bait in a position convenient for impalement on a fishing hook.

In achieving these and other objects which will become apparent hereinafter, the present invention provides a bait container and dispenser comprising a container portion, outlet means on the container portion, closure means removably positioned in the outlet means to close the same, said outlet means comprising spring means permitting free movement of bait through a portion of the outlet means but gripping the bait in said portion in response to removal of the closure means.

The foregoing and other objects and advantages of this invention will be more apparent from the following specification in connection with the drawings, forming a part thereof, wherein:

FIGURE 1 is a perspective view of a bait container, gripper and dispenser according to this invention shown in an upright position;

FIGURE 2 is a vertical, cross sectional view of the bait gripping and dispensing portion of the container shown in FIGURE 1 but shown in a horizontal position; and FIGURE 3 is an enlarged, schematic, vertical cross sectional view of the bait gripping and dispensing portion of the container as shown in FIGURE 2 but shown with the closure element removed therefrom and a fishing hook positioned for impalement of the bait thereon.

Referring in more detail to FIGURE 1 of the drawings, the present bait container, gripper and dispenser comprises an elongated, cylindrical container portion 1 constructed of wire screen or the like. Positioned on an upper end 3 of the container portion 1 is a generally funnel-shaped neck portion 5 comprising a frustoconical section 7, a smaller end of which is fixedly connected to a tubular section 9. The interior of the neck portion 5 is provided with a roughened surface 10 to permit the bait, such as cockroaches or the like, to walk up the roughened surface when the container is positioned in a horizontal position as shown in FIGURE 2.

Fixedly connected on the upper end of the tubular section 9 of the neck portion 5 is a plurality of elongated, longitudinally extending, circularly arranged, circumferentially spaced, resilient spring fingers 12. The spring fingers 12 are circumferentially spaced to provide elongated slots 14 between the spring fingers 12 to permit insertion of a fishing hook therein for impalement of the bait. The spring fingers 12 are connected to the tubular section 9 so that the outer ends 16 of the spring fingers 12 are in a converging relationship relative to one another. The outer ends 16 of the spring fingers 12 are provided with radially inwardly projecting detents 18, semicircular in cross section, formed on the radially inward face thereof. The outer face of the outer ends 16 are provided with a tapered surface 19.

Positioned between the outer ends 16 of the spring fingers 12 is a closure plug 20 having an enlarged spherical head 21 and an annular recess 22 spaced from the inner end 24 thereof. The inner end 24 of the plug 20 includes a tapered surface. The annular recess 22 is dimensioned so that upon insertion of the closure plug 20 between the outer ends 16 of the spring fingers, the spring fingers 12 will be moved in an outward direction relative to the relaxed or converged position shown in FIGURE 3. The head 21 of the closure plug is further provided with an ear 26 on the outer end thereof, the ear having an aperture 28 for reception of one end of a flexible connector 30. On the other end of a flexible connector, a clip 32 may be provided for releasable attachment to an eye 34 fixedly connected on the outer periphery of the frustoconical section 7.

The lower end of the cylindrical container 1 is provided with a circular externally threaded sleeve 36 for threadedly receiving an internally threaded cap 38. The cap 38 may be provided with a flexible connector 40 to facilitate attaching the bait container to a fisherman's belt or the like.

To insert a plurality of grasshoppers or the like in the bait container, the cap 38 is removed and the insects placed within the container. Upon replacement of the cap 38 and positioning the container 1 in a horizontal position, as suggested in FIGURE 2, it is the apparent nature of grasshoppers, cockroaches, or the like that at least one of these insects will crawl up the roughened interior 10 of the neck portion 5, and along the spring fingers 12 until further progress is prohibited by encountering the enclosure plug 20. The insects position themselves for impalement on a hook. Of course, if desired, the container may be turned upside down to manually position the insects in the outlet.

When it is desired to impale an insect on a fishing hook, the plug 20 is removed, as shown in FIGURE 3, thereby releasing the outer ends 16 of the spring fingers 12 to move to a radially inward or converging position. The extent of this movement is sufficient so that an average sized cockroach or grasshopper will be slightly compressed and gripped by the converging spring fingers and held lightly and resiliently in a fixed position. Of course, for very small insects, it may be advantageous to manually urge the spring fingers inwardly to better grip the insect. A fish hook 42 having a fishing line 44 connected thereto may be inserted in the slots 14 between the spring fingers 12 and the grasshopper impaled thereon. Subsequent to impalement of the insect, the hook 42 is pulled in a forwardly direction so as to urge apart the outer ends 16 of the resilient spring fingers, to pull the insect between the detents 18, and out of the outlet of the container.

To reposition the closure plug 20 between the outer ends 16 of the spring fingers 12, it is merely necessary to position the tapered inner surface 24 of the closure plug in an abutting relationship with the tapered surface 19 of the outer ends 16 of the spring fingers. Upon the application of a slight amount of inwardly directed force, the tapered inner surface 24 of the plug cooperates with the tapered outer surfaces 19 and detents 18 of the spring fingers 12 to urge these spring fingers in a diverging relationship thereby permitting convenient entry of the plug between the fingers. Further inward movement of the plug 20 is permitted until the tapered outer surfaces 19 of the fingers abut the enlarged head 21 of the plug and the detents 18 are received and resiliently lodged in the annular recess 22.

In this manner a fishing bait container, gripper and dispenser is provided that makes it unnecessary for the fisherman to physically touch the bait. The insect, of his own volition, positions himself for convenient impalement on a fishing hook. But still further, upon removal of the closure element, no additional manipulation of the bait or the bait gripper is necessary to grip the bait in a position for impalement.

While the invention has been illustrated in but one embodiment, it is recognized that variations and changes may be made therein without departing from the invention as set forth in the claims.

I claim:

1. A closed bait container and dispenser comprising a container portion, outlet means connected to one end of said container portion, said outlet means including a plurality of resilient, longitudinally extending, circularly arranged, circumferentially spaced, spring fingers, inner ends of said plurality of spring fingers connected to said container portion, outer ends of said plurality of spring fingers resiliently urged in a converging direction, and closure means having an inner end removably positioned between the outer ends of said spring fingers and urging said outer ends in a radially outwardly direction, said closure means dimensioned to spread said outer ends of said spring fingers to permit free passage of bait from said container portion to a point adjacent said inner end of said closure means, removal of said closure means resulting in convergence of said spring fingers to grip the bait at said point.

2. A closed bait container and dispenser comprising a container portion, outlet means connected to one end of said container portion, said outlet meas including a plurality of resilient, longitudinally extending, circularly arranged, circumferentially spaced, spring fingers, inner ends of said plurality of spring fingers connected to said container portion, outer ends of said plurality of spring fingers resiliently urged in a converging direction, and closure means removably positioned between the outer ends of said spring fingers and urging said outer ends in a radially outward direction, each of said outer ends of said spring fingers provided with a radially inwardly extending detent thereon, and said closure means provided with a reduced diameter portion spaced from the inner end thereof, said reduced diameter portion removably receiving said detents.

3. A closed bait container and dispenser comprising a cylindrical container having a plurality of apertures in the sides thereof, a cap threadedly positioned on one longitudinal end of said container, an outlet means on the other longitudinal end of said container, said outlet means comprising a generally funnel-shaped neck portion having a roughened interior, a plurality of longitudinally extending circularly positioned, circumferentially spaced, elongated spring fingers, an inner end of each of said spring fingers connected to said neck portion, an outer end of each of said spring fingers converging towards the longitudinal axis of said cylindrical container, each of said outer ends of said spring fingers having a radially inwardly projecting detent, a closure element positioned between said spring fingers, said closure element having an annular recess spaced from the inner end thereof, said annular recess removably receiving said detents, the inner end of said closure element being tapered to aid in positioning said closure element between said spring fingers and flexible means connecting said closure element with the remainder of the container.

References Cited by the Examiner

UNITED STATES PATENTS

| | | | |
|---|---|---|---|
| 2,756,912 | 7/1956 | Armstrong | 43—55 X |
| 2,982,045 | 5/1961 | Highland | 43—4 |
| 3,164,067 | 1/1965 | Hurst | 43—4 |

SAMUEL KOREN, *Primary Examiner.*

W. H. CAMP, *Assistant Examiner.*